US012600593B2

(12) United States Patent
Tran

(10) Patent No.: US 12,600,593 B2
(45) Date of Patent: Apr. 14, 2026

(54) DOCUMENT TRANSPORT DEVICE INCLUDING STOPPER FOR PREVENTION OF FALLING OF DOCUMENT AND IMAGE FORMING APPARATUS

(71) Applicant: KYOCERA Document Solutions Inc., Osaka (JP)

(72) Inventor: Chi Thi Tran, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/786,145

(22) Filed: Jul. 26, 2024

(65) Prior Publication Data

US 2025/0033916 A1 Jan. 30, 2025

(30) Foreign Application Priority Data

Jul. 28, 2023 (JP) ................................ 2023-123426

(51) Int. Cl.

*B65H 31/10* (2006.01)
*B65H 29/52* (2006.01)
*G03G 15/00* (2006.01)

(52) U.S. Cl.

CPC ............ *B65H 31/10* (2013.01); *B65H 29/52* (2013.01); *G03G 15/6502* (2013.01); *G03G 15/6529* (2013.01); *G03G 15/6552* (2013.01)

(58) Field of Classification Search

CPC .... B65H 31/10; B65H 29/52; G03G 15/6502; G03G 15/6529; G03G 15/6552
See application file for complete search history.

(56) References Cited

U.S. PATENT DOCUMENTS 8,424,871 B2 * 4/2013 Ino ........................ B65H 31/20 271/223
10,131,511 B2 * 11/2018 Murodate ............. B65H 31/00

FOREIGN PATENT DOCUMENTS

JP 2021147119 A 9/2021

* cited by examiner

*Primary Examiner* — Thomas A Morrison
(74) *Attorney, Agent, or Firm* — IP Business Solutions, LLC.

(57) ABSTRACT

A document transport device includes an ejection tray on which documents ejected in a predetermined ejection direction are loaded and a stopper that prevents documents from falling from the ejection tray in the ejection direction. The stopper has a rotating shaft rotatably supported at the ejection tray in a direction intersecting the ejection direction, a contact piece provided at the rotating shaft to be hit by a tip of a document in the ejection direction, and a weight piece provided at the rotating shaft. The stopper is able to pivot to be in a standing posture in which the contact piece stands due to the weight of the weight piece and pivot to be in a tilting posture in which the stopper tilts in the ejection direction from the standing posture when a predetermined force is applied to the contact piece.

6 Claims, 9 Drawing Sheets

DOCUMENT TRANSPORT DEVICE INCLUDING STOPPER FOR PREVENTION OF FALLING OF DOCUMENT AND IMAGE FORMING APPARATUS

INCORPORATION BY REFERENCE

This application claims priority to Japanese Patent Application No. 2023-123426 filed on Jul. 28, 2023, the entire contents of which are incorporated by reference herein.

BACKGROUND

The present disclosure relates a document transport device including an ejection tray with a stopper and an image forming apparatus.

An image forming apparatus includes a document transport device that transports documents, an image reading device that reads images on the transported documents, and an image forming device that forms images on sheets based on the read images. The document transport device is provided with a paper feed tray on which documents are placed and an ejection tray provided below the paper feed tray and loaded with documents whose images have been read by the image reading device are loaded. In addition, the ejection tray includes a stopper that prevents sheets from falling in the ejection direction.

The stopper is generally designed to be supported in a substantially vertical posture, so it is hit by a tip of an ejected sheet. For this reason, the interval between the stopper and the paper feed tray provided above the ejection tray is narrow, and thus there is a problem that it is difficult to take out the documents loaded on the ejection tray.

Here, a stopper that can be shifted between a standing position and a tilting position is disclosed. The stopper is biased to the standing position by a biasing member when the stopper is at a position closer to the standing position than to the neutral position between the standing position and a tilting position, and is biased to the tilting position by the biasing member at a position closer to the tilting position than to the neutral position. If the stopper is pressed from the standing position to the tilting position when it is attempted to take out a document from the ejection tray, the stopper rotates to the tilting position, and thus the document can be easily taken out.

SUMMARY

As an aspect of the present disclosure, a technique obtained by further improving the above-described technique is proposed.

A document transport device according to an aspect of the present disclosure includes a paper feed tray, a transport device, an ejection tray, and a stopper. The paper feed tray allows documents to be placed thereon. The transport device transports the documents placed on the paper feed tray. The ejection tray is disposed below the paper feed tray and loaded with the documents ejected from the transport device in a predetermined ejection direction. The stopper prevents the documents from falling from the ejection tray in the ejection direction. The stopper includes a rotating shaft, a contact piece, and a weight piece. The rotating shaft is rotatably supported at the ejection tray in a direction intersecting the ejection direction. The contact piece is provided at the rotating shaft and hit by a tip of a document in the ejection direction. The weight piece is provided at the rotating shaft and rotates together with the rotating shaft. The stopper is able to pivot to a standing posture in which the contact piece stands due to the weight piece's own weight and pivot to a tilting posture in which the stopper tilts in the ejection direction from the standing posture when a predetermined force is applied to the contact piece.

An image forming apparatus according to another aspect of the present disclosure includes the document transport device according to the aspect of the present disclosure, an image reading device, and an image forming device. The image reading device reads an image on a document transported by the document transport device. The image forming device forms an image on a sheet based on the read image.

DETAILED DESCRIPTION

A document transport device and an image forming apparatus according to an embodiment as an aspect of the present disclosure will be described.

Figure 1:
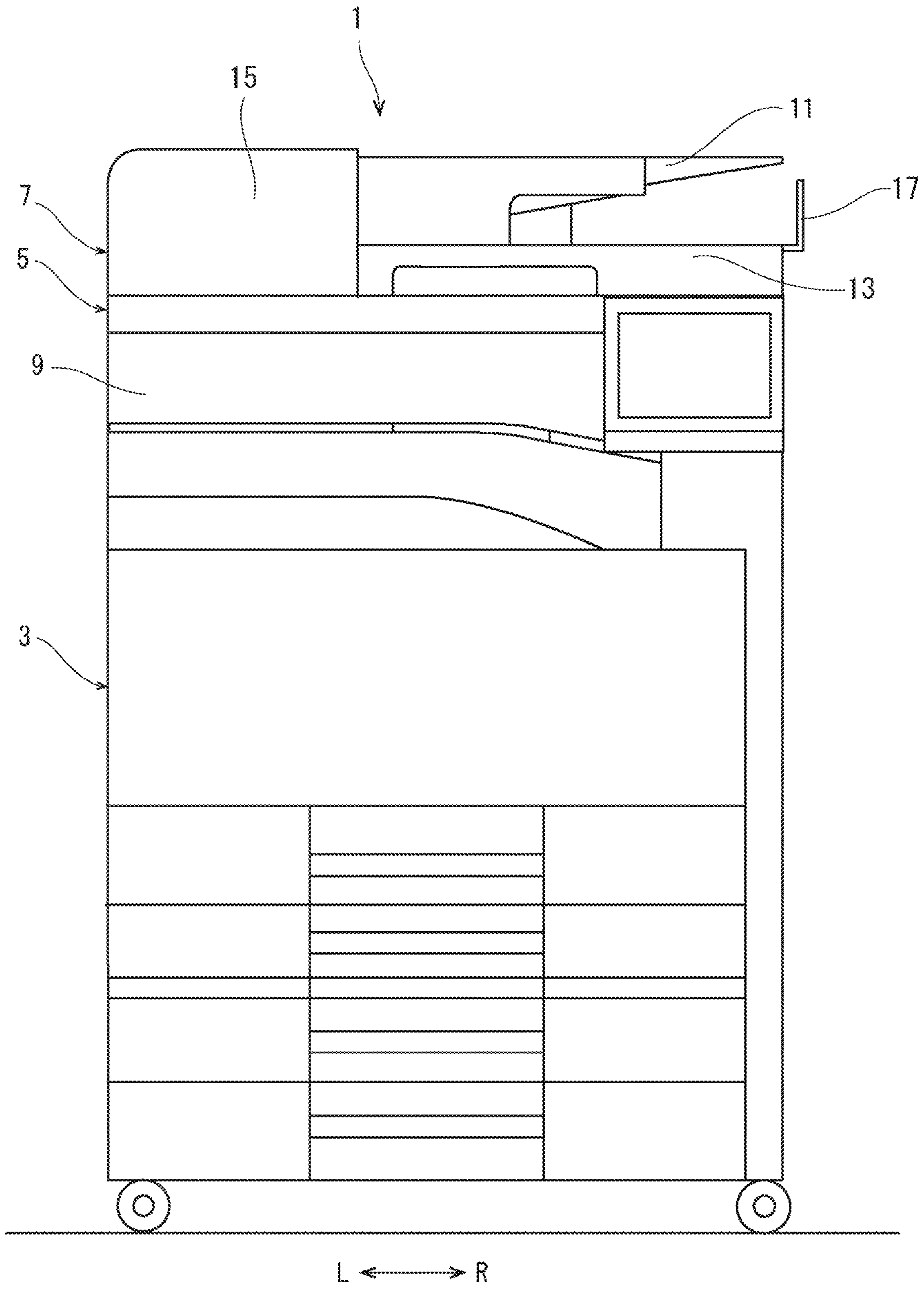
FIG. 1 is a front view illustrating an image forming apparatus according to an embodiment of the present disclosure.

First, an overall configuration of the image forming apparatus 1 will be described with reference to FIG. 1. FIG. 1 is a front view illustrating the image forming apparatus 1. Fr, Rr, L, and R shown in each drawing indicate the front, rear, left, and right sides of the image forming apparatus 1, respectively.

The image forming apparatus 1 includes an image forming device 3, an image reading device 5 disposed above the image forming device 3, and a document transport device 7 disposed above the image reading device 5. An internal paper ejection space 9 is formed between the image forming device 3 and the image reading device 5.

The document transport device 7 includes a paper feed tray 11 on which documents are placed, an ejection tray 13 provided below the paper feed tray 11, and a transport device 15 having a lateral U-shaped transport path on which documents are transported from the paper feed tray 11 toward the ejection tray 13. A document placed on the paper feed tray 11 is fed to the transport device 15 and transported along the transport path. At this time, the image reading device 5 reads an image on the document. The document whose image has been read is ejected from the transport device 15 to the ejection tray 13 and placed on the ejection tray 13. The image forming device 3 forms an image on a sheet based on the image read by the image reading device 5.

Figure 2A:
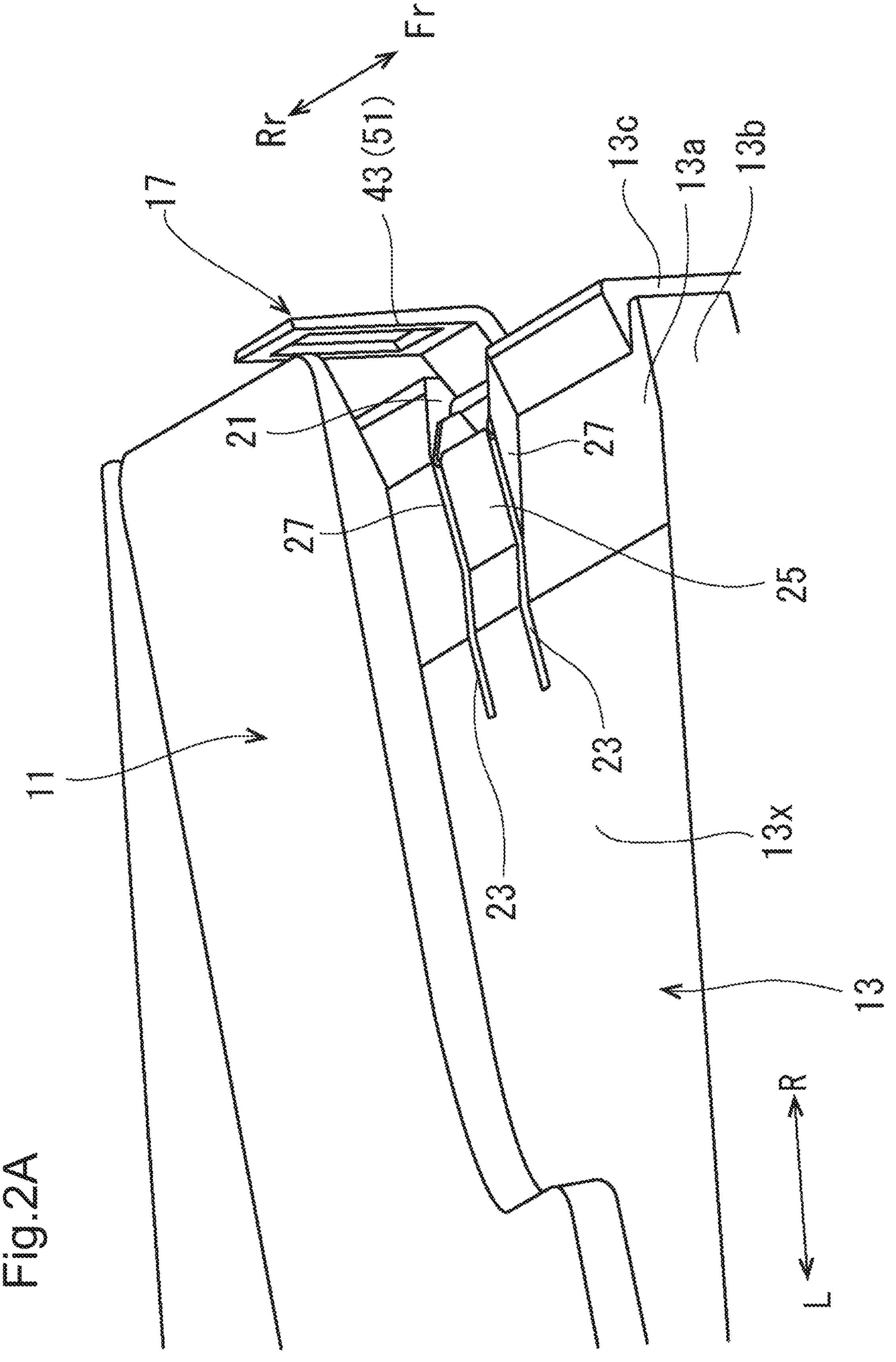
FIG. 2A is a perspective view illustrating an ejection tray of a document transport device according to an embodiment of the present disclosure.
Figure 2B:
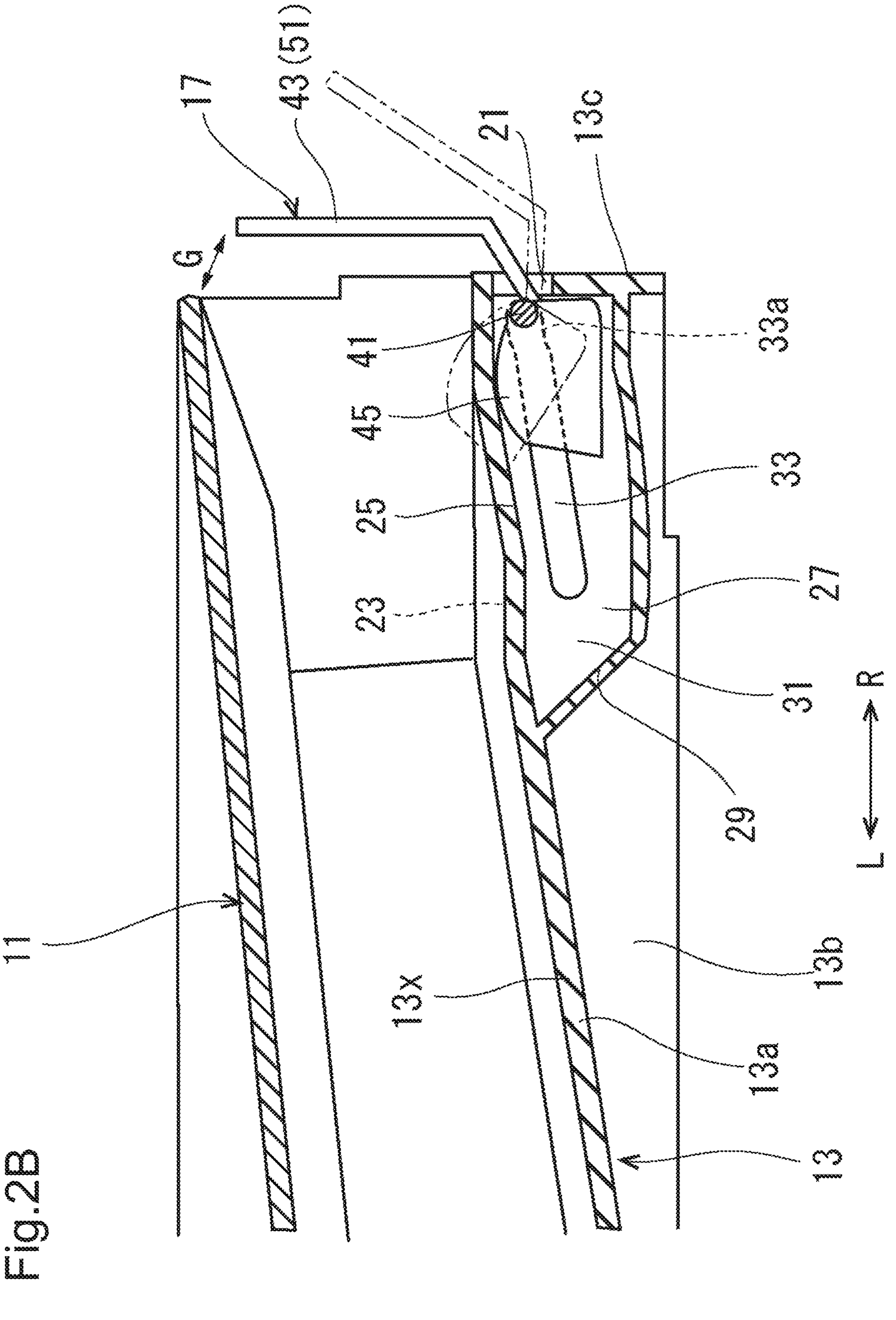
FIG. 2B is a cross-sectional view illustrating the ejection tray of the document transport device according to an embodiment of the present disclosure.

Next, the ejection tray 13 will be described with reference to FIGS. 2A and 2B. FIG. 2A is a perspective view illustrating the ejection tray 13, and FIG. 2B is a cross-sectional view illustrating the ejection tray 13. In this example, a case in which the maximum size of an ejected document is the A4 portrait size will be described.

The ejection tray 13 is formed in a flat hollow rectangular shape, has an upper plate 13*a*, front and rear side plates 13*b*, and an end plate 13*c*, and has an open bottom surface. A document loading surface 13*x* on which documents are placed is formed on the top surface of the upper plate 13*a*. The document loading surface 13*x* slightly slopes toward the tip side of a document in the ejection direction from the transport device 15 (the downstream side or the right side of FIGS. 2A and 2B). A stopper 17 is supported at the end on the tip side of the ejection tray 13 in the ejection direction. The stopper 17 prevents documents from falling from the document loading surface 13*x* in the ejection direction.

A notch 21 having a predetermined width is formed at the center of the corner between the upper plate 13*a* and the end plate 13*c* of the ejection tray 13 in the width direction intersecting the ejection direction. Slits 23 are formed on the upper plate 13*a* on both sides of the notch 21 in the width direction along the ejection direction. Slits 23 are formed from the notch 21 in the direction opposite to the ejection direction. A support piece 25 is provided between both of the slits 23. The support piece 25 does not reach the end plate 13*c* according to the size of the notch 21. The top surface of the support piece 25 forms a part of the document loading surface 13*x*, and slopes upward having a predetermined slope toward the downstream side in the ejection direction.

In addition, guide side walls 27 are formed on both sides of both of the slits 23 in the width direction on the back surface of the upper plate 13*a*. Furthermore, an end wall 29 is formed between the ends of both of the guide side walls 27 on the upstream side in the ejection direction. The end wall 29 slopes upward toward the upstream side in the ejection direction. Furthermore, a hollow housing 31 whose surface on the downstream side in the ejection direction is open is formed between both of the guide side walls 27 and the end wall 29. Guide grooves 33 that are substantially parallel to the document loading surface 13*x* and slope slightly upward toward the upstream side in the ejection direction are formed in both of the guide side walls 27. Downstream ends 33*a* of the guide grooves 33 in the ejection direction are bent to extend almost horizontally.

Figure 3:
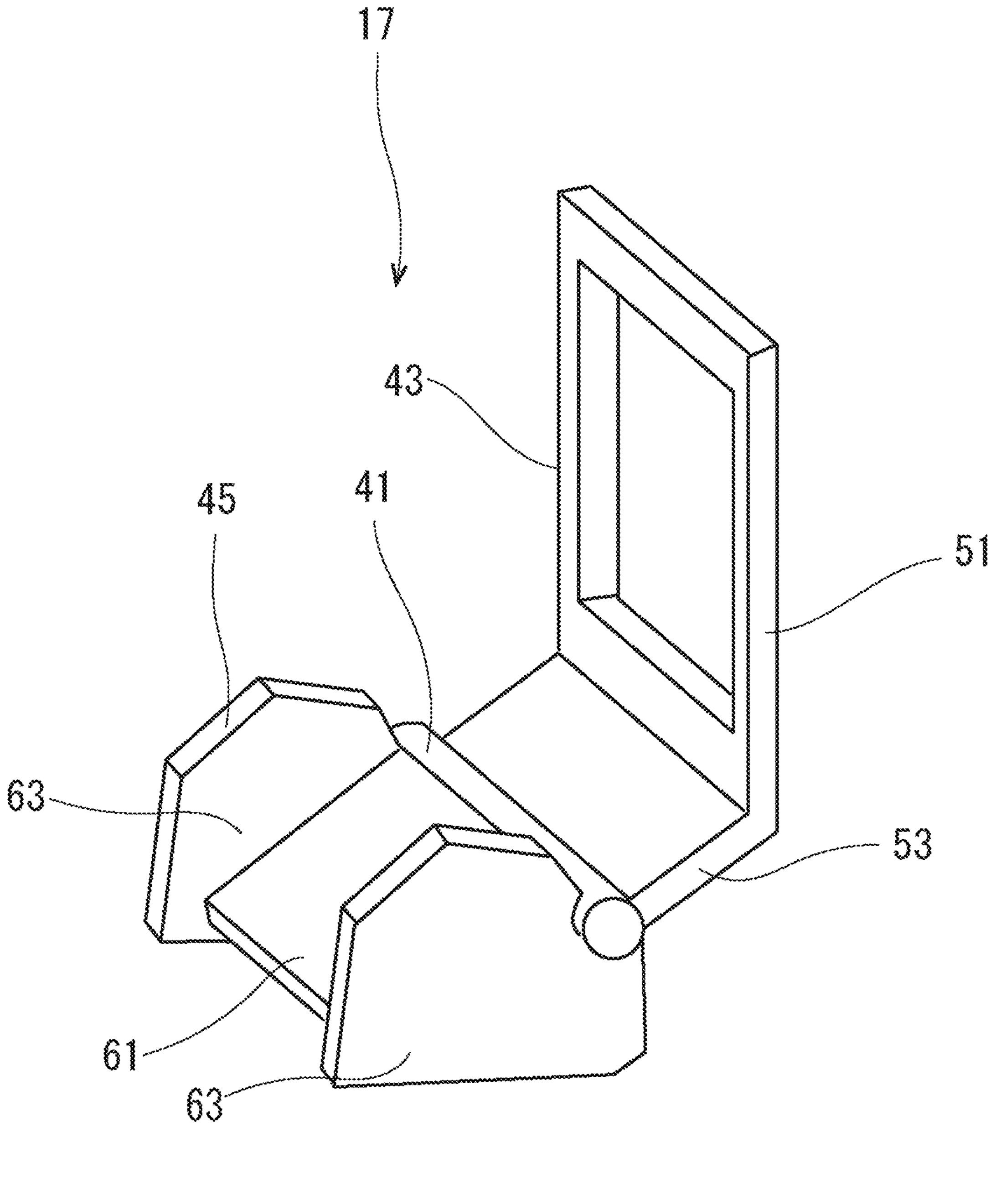
FIG. 3 is a perspective view illustrating a stopper included in the document transport device according to an embodiment of the present disclosure.

Next, the stopper 17 will be described with reference to FIG. 3. FIG. 3 is a perspective view illustrating the stopper 17.

The stopper 17 includes a rotating shaft 41 having a predetermined length, and a contact piece 43 and a weight piece 45 that are fixed to the rotating shaft 41. The contact piece 43 has a substantially L shape in a side view, and includes a rectangular frame-shaped contact part 51 and a rectangular plate-shaped fixed part 53 that is bent at an obtuse angle with respect to the contact part 51. The weight piece 45 includes a rectangular plate-shaped fixed part 61 and a pair of side wall parts 63 fixed to both side surfaces of the fixed part 61 in the axial direction of the rotating shaft 41. The side wall parts 63 are formed in a substantially trapezoidal shape in a side view. The fixed part 53 of the contact piece 43 and the fixed part 61 of the weight piece 45 are fixed to the rotating shaft 41 in the axial direction such that the fixed parts extend in the opposite directions from the radial direction of the rotating shaft 41. Both end parts of the rotating shaft 41 extend further outward in the axial direction than the contact piece 43 and the weight piece 45. A weight of the weight piece 45 is set to be heavier than a weight of the contact piece 43.

As illustrated in FIGS. 2A and 2B, the stopper 17 is housed in the notch 21 of the ejection tray 13 in a posture that the contact piece 43 faces downstream in the ejection direction and the weight piece 45 faces upstream in the ejection direction. Both end parts of the rotating shaft 41 are inserted into the guide grooves 33 formed in both of the guide side walls 27 of the ejection tray 13. In addition, most of the weight piece 45 is housed in the housing 31, and both of the side wall parts 63 are inserted into the slits 23 of the upper plate 13*a* of the ejection tray 13.

When both ends of the rotating shaft 41 are inserted into the downstream ends 33*a* of the guide grooves 33, the stopper 17 takes a standing posture in which the contact part 51 of the contact piece 43 becomes substantially vertical (sloping at an obtuse angle with respect to the document loading surface 13*x* of the ejection tray 13) and the weight piece 45 is housed in the housing 31 of the ejection tray 13. Specifically, the stopper 17 attempts to pivot around the rotating shaft 41 counterclockwise due to the weight of the weight piece 45 in FIGS. 2A and 2B. Then, the weight piece 45 comes into contact with the end plate 13*c* of the ejection tray 13 in the inside, and thus pivoting of the weight piece is prevented. Accordingly, the stopper 17 pivots to be in the standing posture. In addition, since the downstream ends 33*a* of the guide grooves 33 are formed substantially horizontally as described above, movement of both ends of the rotating shaft 41 in the direction opposite to the ejection direction along the guide grooves 33 is regulated. A predetermined gap G is open between the top end of the contact piece 43 of the stopper 17 and the paper feed tray 11.

On the other hand, when a force is applied to the contact piece 43 downstream in the ejection direction, the stopper 17 pivots around the rotating shaft 41 clockwise in FIGS. 2A and 2B, and thereby takes a tilting posture (see the two-dot chain line in FIG. 2B). At this time, both of the side wall parts 63 of the weight piece 45 protrude above the document loading surface 13*x* through the slits 23 of the upper plate 13*a* of the ejection tray 13. The stopper 17 can pivot clockwise until the fixed part 53 of the contact piece 43 comes in contact with the end surface of the notch 21 (the upper surface of the end plate 13*c*) or until the fixed part 61 of the weight piece 45 comes in contact with the bottom surface of the support piece 25. When the stopper 17 pivots to be in the tilting position as described above, the gap G between the top end of the contact piece 43 of the stopper 17 and the paper feed tray 11 is widened.

Next, an operation of the stopper 17 when a document is ejected to the ejection tray 13 having the above configuration will be described with reference to FIGS. 4A to 4C, 5A, and 5B. FIGS. 4A to 4C, 5A, and 5B are cross-sectional views illustrating the stopper 17.

Figure 4A:
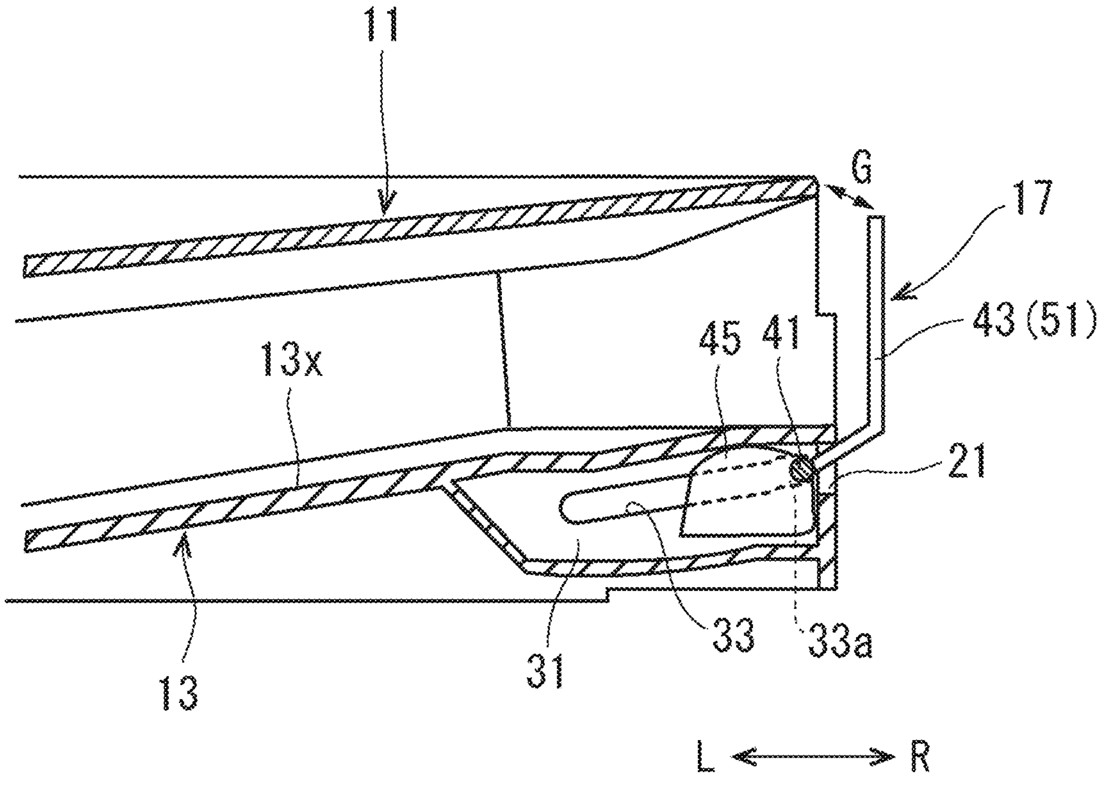
FIG. 4A is a cross-sectional view illustrating the stopper included in the document transport device at a normal time according to an embodiment of the present disclosure.

The stopper 17 pivots to be in the standing position in the normal state as illustrated in FIG. 4A. When the transport device 15 ejects a document, a tip of the document hits the contact piece 43 (contact part 51) of the stopper 17. Then, a force is applied to the contact piece 43 in the ejection direction, and the stopper 17 attempts to pivot to be in the tilting posture. However, since the force applied to the contact piece 43 by the document is smaller than a force applied by the weight of the weight piece 45, the stopper 17 maintains the standing posture.

Figure 4B:
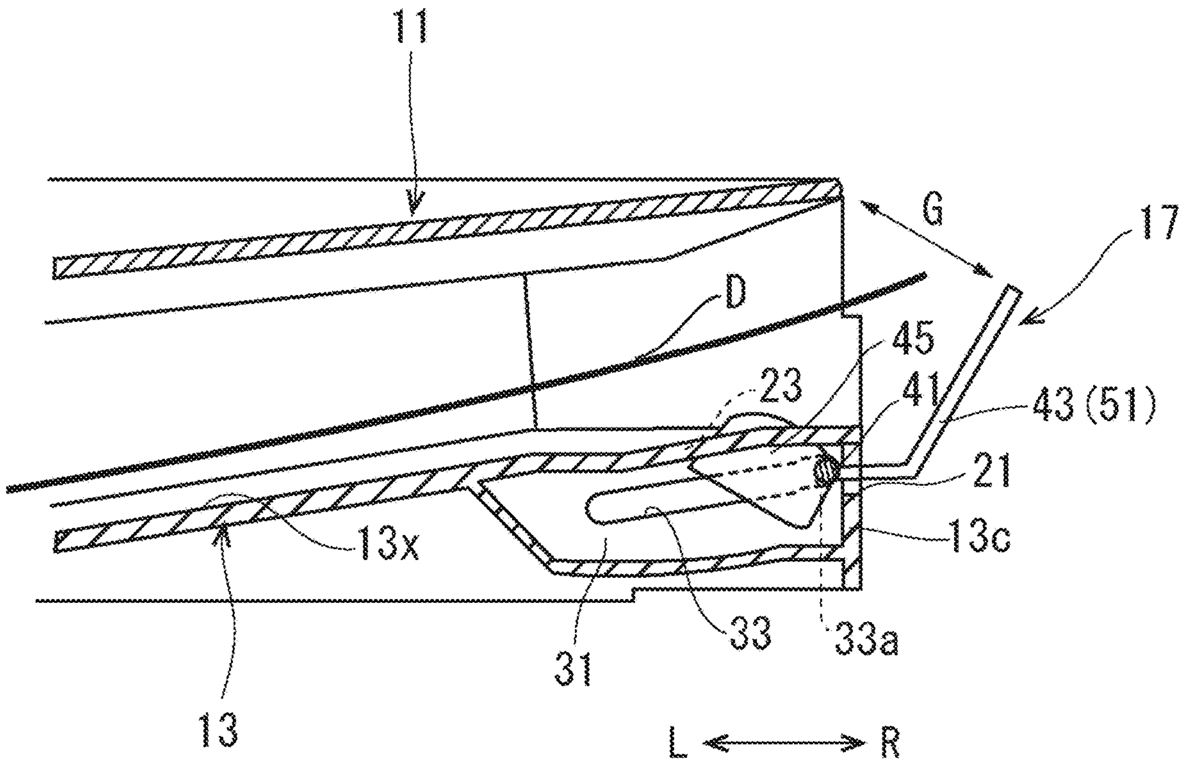
FIG. 4B is a cross-sectional view illustrating the stopper included in the document transport device according to an embodiment of the present disclosure when a document is taken out.

When the document D ejected onto the document loading surface 13*x* is to be taken out, the document D is grabbed and pulled out downstream in the ejection direction as it is. At this time, when a force greater than the force applied by the weight of the weight piece 45 is applied to the contact piece 43 as the document D or a user's hand hits the contact piece 43 of the stopper 17, the stopper 17 pivots from the standing posture to the tilting posture as illustrated in FIG. 4B. Accordingly, the gap G between the top end of the contact piece 43 of the stopper 17 and the paper feed tray 11 becomes wider, which enables the document D to be taken out through the gap G.

Figure 4C:
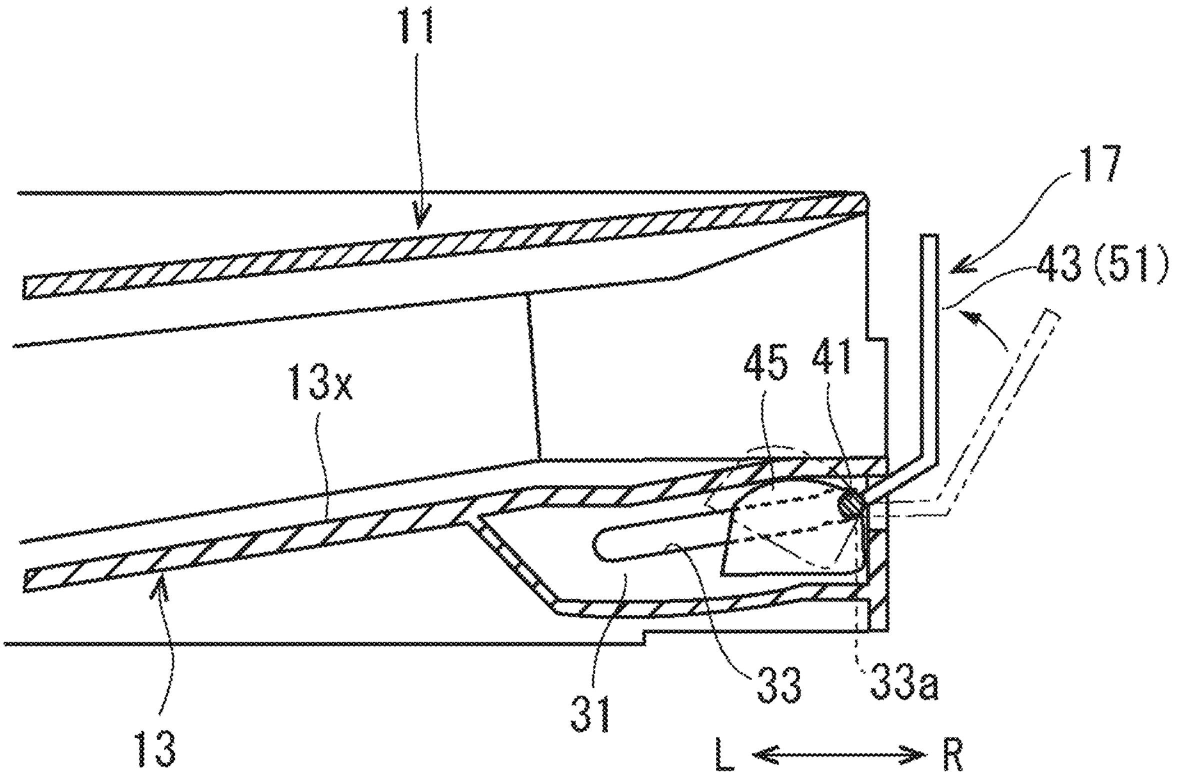
FIG. 4C is a cross-sectional view illustrating the stopper included in the document transport device according to an embodiment of the present disclosure after a document is taken out.

When the power applied to the contact piece 43 is released, the stopper 17 returns to the standing posture due to the weight of the weight piece 45 as illustrated in FIG. 4C. Alternatively, the stopper 17 may not automatically return to the standing posture from the tilting posture. If the document to be ejected next is ejected onto the document loading surface 13*x* in such a case, the document pushes down the side wall parts 63 of the weight piece 45 protruding from the document loading surface 13*x*. Accordingly, the stopper 17 pivots counterclockwise to return to the standing posture.

Figure 5A:
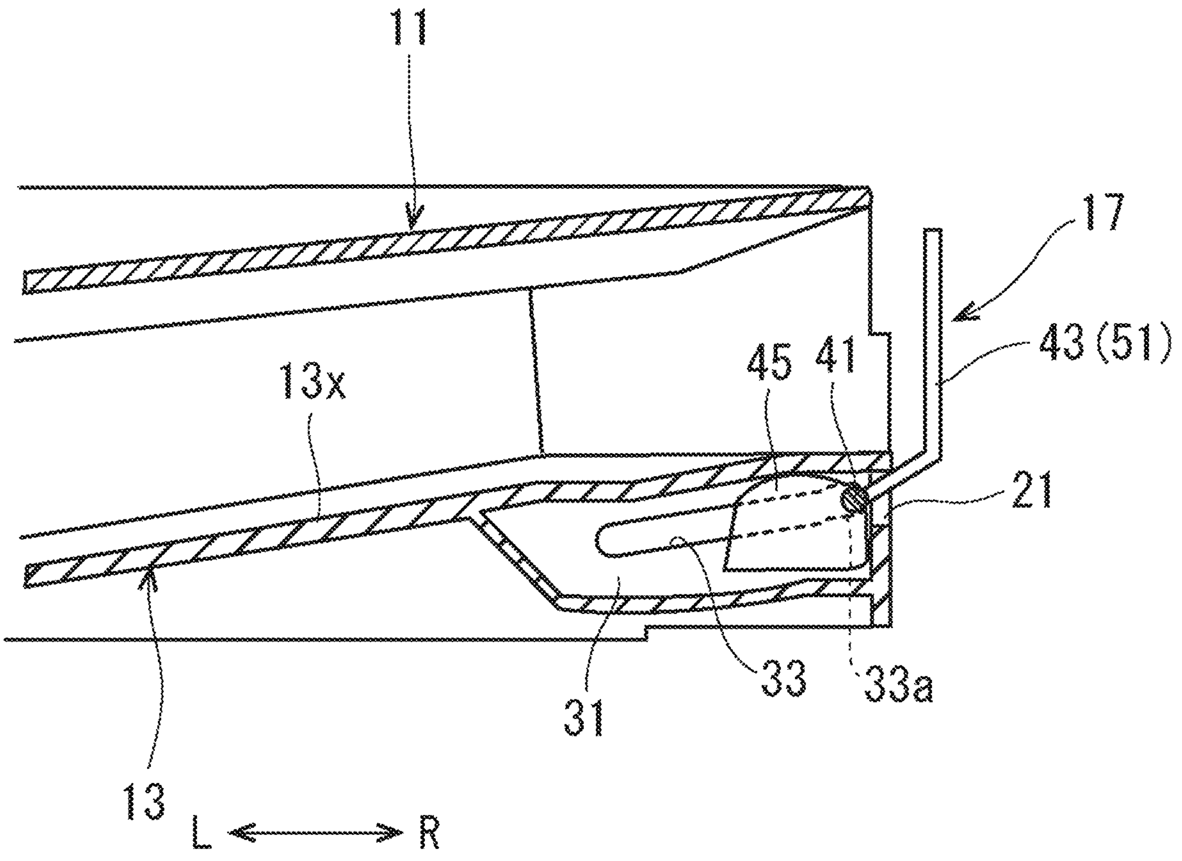
FIG. 5A is a cross-sectional view illustrating the stopper included in the document transport device according to an embodiment of the present disclosure when a document having a predetermined size is ejected.
Figure 5B:
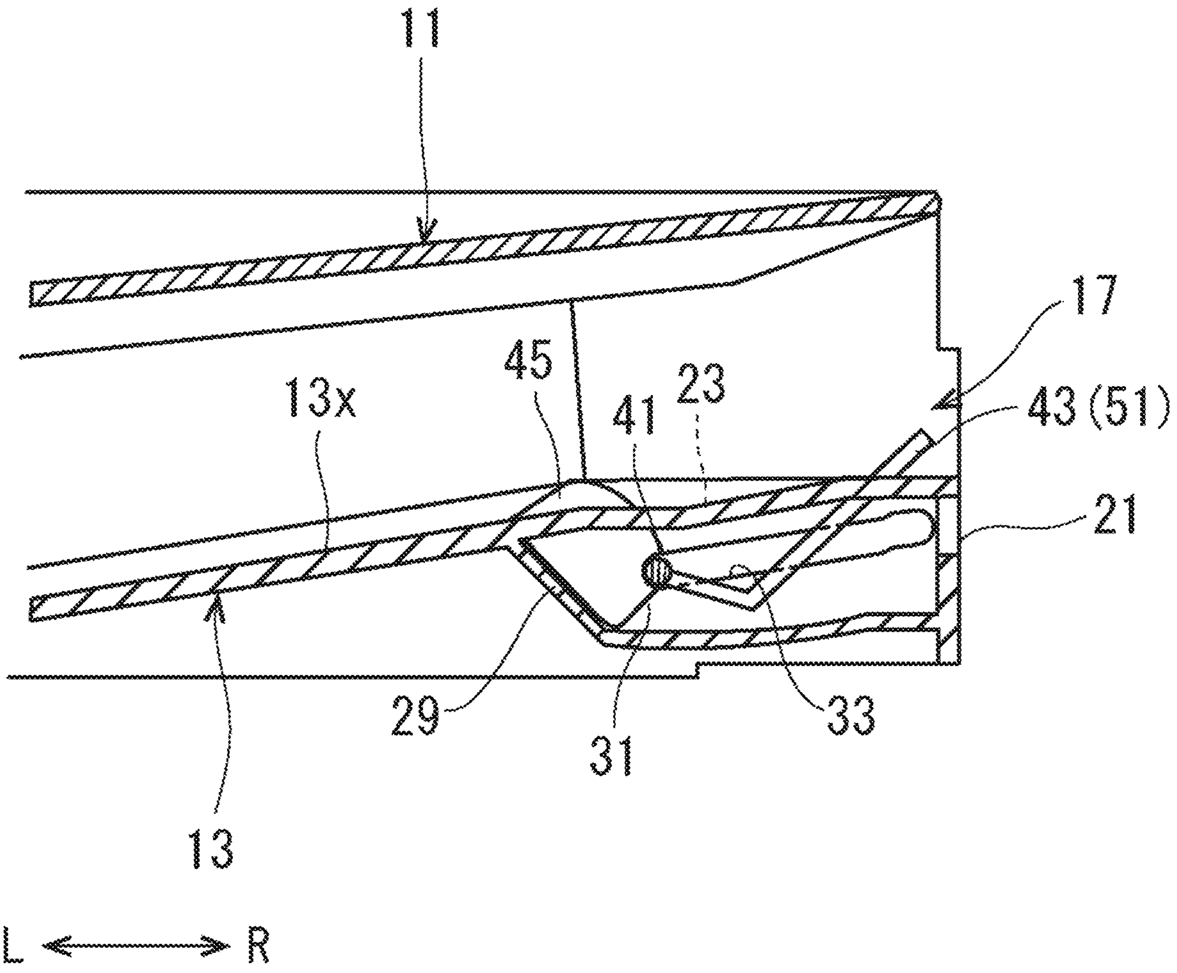
FIG. 5B is a cross-sectional view illustrating the stopper included in the document transport device according to an embodiment of the present disclosure when a document having a size greater than the predetermined size is ejected.

In addition, when a document that is longer (for example, A3 portrait size) than a predetermined length (in this example, A4 portrait size) is transported, the stopper 17 attempting to pivot to be in the standing posture obstructs the ejection of the document. In such a case, the rotating shaft 41 of the stopper 17 is moved from the position indicated in FIG. 5A in the direction opposite to the ejection direction along the guide grooves 33. At this time, both of the side wall parts 63 of the weight piece 45 of the stopper 17 move along the slits 23. Then, the contact piece 43 eventually comes in contact with the end surface of the support piece 25 of the ejection tray 13. Accordingly, the contact piece 43 is pressed by the support piece 25, and the stopper 17 pivots clockwise around the rotating shaft 41 in FIG. 5A. If the stopper 17 is moved in this state, the end surfaces (bottom surfaces) of the side wall parts 63 of the weight piece 45 eventually hit the end wall 29 of the housing 31 as illustrated in FIG. 5B. In this way, the pivoting of the stopper 17 is regulated.

As a result, most of the stopper 17 is housed in the housing 31 as illustrated in FIG. 5B, and thus only parts of both of the side wall parts 63 of the weight piece 45 and the tip part of the contact part 51 of the contact piece 43 protrude upward from the document loading surface 13*x*. Therefore, the ejection of documents having a large size is not interrupted.

According to the present disclosure, when a force is applied to the stopper 17 when a document loaded on the ejection tray 13 is grabbed and pulled out, the stopper 17 automatically pivots from the standing posture to the tilting posture as described above, and thus the document can be easily taken out. In addition, since the stopper 17 automatically returns to the standing posture after pivoting in the tilting posture, the stopper 17 does not need to be manually operated. Furthermore, a height of the document transport device 7 does not need to be increased in order to widen the gap G between the stopper 17 and the paper feed tray 11.

In addition, when the stopper 17 pivots to be in the tilting posture, the weight piece 45 protrudes upward from the document loading surface 13*x* of the ejection tray 13. If the stopper 17 does not return to the standing posture after pivoting in the tilting posture, the document ejected next pushes down the weight piece 45 protruding from the document loading surface 13*x*, and thus the stopper 17 automatically returns to the standing posture.

Furthermore, since most of the stopper 17 is housed in the housing 31 below the document loading surface 13*x* when the rotating shaft 41 is moved in the direction opposite to the ejection direction along the guide grooves 33, the ejection of documents having a size larger than the predetermined size is not interrupted.

According to the present embodiment, if a force is applied to the stopper 17 when a document loaded on the ejection tray 13 is grabbed and pulled out, the stopper 17 pivots from the standing posture to the tilting posture, and thus, the document can be easily taken out. In addition, since the stopper automatically returns to the standing posture after pivoting to the tilting posture, the stopper does not need to be manually operated.

However, because a stopper provided in a document transport device that is not based on the present embodiment is manually shifted between a standing position and a tilting position, a user needs to manually pivot the stopper from the standing position to the tilting position to take out a document, and manually pivot the stopper from the tilting position to the standing position after taking out the document. For this reason, there is a problem that time and effort are required to perform the pivoting operation for the stopper, or pivoting the stopper from the tilting position to the standing position will be forgotten. In contrast, the stopper 17 according to the above embodiment maintains the standing posture on its own, pivots to the tilting posture when a predetermined force is applied, and further returns to the standing posture on its own when the force is released, and thus users can simply take out the documents loaded on the ejection tray 13.

Although the present disclosure is described about a specific embodiment, the present disclosure is not limited thereto. The embodiment may be variously modified, replaced, and transformed as long as it is not departing from the range and gist of the present disclosure, and the claims include all embodiments that can fall within the scope of the technical concept.

What is claimed is:

1. A document transport device comprising:

a paper feed tray on which a document is placed;

a transport device configured to transport the document placed on the paper feed tray;

an ejection tray that is disposed below the paper feed tray and loaded with the document ejected from the transport device in a predetermined ejection direction; and a stopper configured to prevent the document from falling from the ejection tray in the ejection direction, wherein the stopper includes a rotating shaft rotatably supported at the ejection tray in a direction intersecting the ejection direction, a contact piece that is provided at the rotating shaft and hit by a tip of a document in the ejection direction, and a weight piece that is provided at the rotating shaft and pivots along with the rotating shaft, and the stopper is able to pivot to be in a standing posture in which the contact piece stands due to the weight of the weight piece and pivot to be in a tilting posture in which the stopper tilts in the ejection direction from the standing posture when a predetermined force is applied to the contact piece, wherein the ejection tray includes a guide groove formed in the ejection direction to guide the rotating shaft, and when the rotating shaft is moved in the direction opposite to the ejection direction along the guide groove, the stopper is housed below a top surface of the ejection tray and only a part of the stopper protrudes from the top surface of the ejection tray, wherein, when the rotating shaft is moved in the direction opposite to the ejection direction along the guide groove, the contact piece comes in contact with a support piece provided at an end part of the ejection tray and be pressed by the support piece, and the pressing causes the stopper to pivot around the rotating shaft to be in a posture in which the stopper is housed below the top surface of the ejection tray.

2. The document transport device according to claim 1, wherein a document loading surface is formed in a portion on the ejection tray on which documents are loaded, and when the stopper pivots to be in the tilting posture, the weight piece protrudes from a top surface of the ejection tray through a slit formed on the document loading surface.

3. The document transport device according to claim 1, wherein the ejection tray includes a slit formed in the ejection direction to allow the weight piece to pass through when the rotating shaft is guided along the guide groove.

4. The document transport device according to claim 1, wherein, when the rotating shaft is moved in the direction opposite to the ejection direction along the guide groove, a part of a slit protruding from the top surface of the ejection tray is a part of both of side wall parts of the weight piece and a tip part of the contact piece in the ejection direction.

5. The document transport device according to claim 3, wherein, when the rotating shaft is moved in the direction opposite to the ejection direction along the guide groove, both of side wall parts of the weight piece of the stopper move along the slit.

6. An image forming apparatus comprising:

the document transport device according to claim 1;

an image reading device configured to read an image on a document transported by the document transport device; and an image forming device configured to form an image on a sheet based on the read image.

* * * * *